United States Patent [19]

Laeremans et al.

[11] Patent Number: 5,775,702
[45] Date of Patent: Jul. 7, 1998

[54] SEALING ARRANGEMENT

[75] Inventors: Etienne Laeremans, Scherpenheuvel-Zichen; Marc Demesmaeker, Antwerpen, both of Belgium

[73] Assignee: N.V. Raychem S.A., Kessel-Lo, Belgium

[21] Appl. No.: 704,686

[22] PCT Filed: Mar. 6, 1995

[86] PCT No.: PCT/GB95/00469

§ 371 Date: Dec. 2, 1996

§ 102(e) Date: Dec. 2, 1996

[87] PCT Pub. No.: WO95/24756

PCT Pub. Date: Sep. 14, 1995

[30]  Foreign Application Priority Data

Mar. 7, 1994 [GB] United Kingdom ............... 9404396

[51] Int. Cl.$^6$ ............................................. F16J 15/00
[52] U.S. Cl. ........................... 277/314; 277/606; 277/627; 174/65 SS; 174/151; 174/152 G
[58] Field of Search ................................. 277/102, 104, 277/105, 192, 193, 199, 314, 606, 627; 174/65 SS, 65 G, 151, 152 G, 153 G

[56]  References Cited

U.S. PATENT DOCUMENTS

| | | | |
|---|---|---|---|
| 2,586,892 | 2/1952 | Weber et al. | 174/65 SS |
| 3,569,608 | 3/1971 | Ance . | |
| 4,251,680 | 2/1981 | Germann | 174/151 |
| 4,267,401 | 5/1981 | Wilkinson | 174/65 SS |
| 4,377,291 | 3/1983 | Albertini | 277/105 |
| 4,622,436 | 11/1986 | Kinnan . | |
| 4,627,490 | 12/1986 | Moore | 174/65 SS |
| 4,993,724 | 2/1991 | Hauff | 277/105 |
| 5,278,357 | 1/1994 | Yamanashi | 174/151 |
| 5,290,073 | 3/1994 | Chen . | |
| 5,313,018 | 5/1994 | Meltsch et al. . | |
| 5,442,140 | 8/1995 | McGrane | 174/151 |

FOREIGN PATENT DOCUMENTS

| | | |
|---|---|---|
| 0 476 909 | 3/1992 | European Pat. Off. . |
| 0 514 861 A1 | 11/1992 | European Pat. Off. . |
| 0 543 350 A1 | 5/1993 | European Pat. Off. . |
| 0 580 130 A1 | 1/1994 | European Pat. Off. . |
| 7733831 | of 0000 | Germany . |
| 1 142 112 | 2/1969 | United Kingdom . |
| 90 05401 | 5/1990 | WIPO . |
| WO 94/13047 | 6/1994 | WIPO . |

*Primary Examiner*—Daniel G. DePumpo
*Attorney, Agent, or Firm*—Herbert G. Burkard

[57]  ABSTRACT

A sealing apparatus for sealing an end of an enclosure having an opening for passing an elongate object, such as a cable, therethrough is disclosed. The sealing apparatus includes a sealing device with a port through the sealing device. The sealing device is configured so as to be placed within an end of the enclosure and in sealing engagement with an inner surface of the enclosure. An adaptor is further disclosed which is configured to be inserted within the port of the sealing device. An opening is provided in the adaptor for receiving the elongate object to be passed into the enclosure. The adaptor further includes a first compressing part and a second compressing part longitudinally offset from the first compressing part with a sealant disposed between the compressing parts. A driver in the sealing device is operatively connected to the compressing parts to position the compressing parts in longitudinally movable positions relative to each other. Longitudinal movement of the compressing parts towards each other compresses the sealant into contact with an elongate object in the opening of the adaptor. Sealing methods are also disclosed utilizing the apparatus of the present invention.

14 Claims, 8 Drawing Sheets

SEALING ARRANGEMENT

BACKGROUND OF THE INVENTION

The present invention relates to a sealing arrangement for sealing an annular space around one or more elongate objects, to an adaptor for a sealing device and to a method of sealing.

SUMMARY OF THE INVENTION

Annular spaces around elongate objects, for example wires, cables or pipes, commonly need to be sealed from the environment. Such annular spaces may, for example, be the ends of cable splice closures, cable or pipe ducts, or spaces in walls etc. through which pipes or cables must extend (commonly referred to as 'feedthroughs'). The present invention is particularly applicable to cable (either optical fibre cable or metal wire cable) splice closures, but it may also have utility in ducts and feedthroughs and indeed any annular space around elongate objects which needs to be sealed. The expression 'annular space' as used herein is given a broad meaning as generally being any space bounded by an outer and an inner object. One or both of those objects may generally be substantially circular in cross-section (e.g. in the case of a cable splice closure) but the expression is not, at least in its broadest meaning, limited to spaces defined by circular boundaries.

Over many years a wide variety of solutions to the problem of sealing annular spaces containing elongate objects have been proposed. A particularly successful solution to the problem is that disclosed in International Patent Application No. WO 90/05401 (Raychem B161) which discloses a closure assembly having a cable seal formed from a substantially rigid portion and a sealing material, for example gel, retained by the rigid portion. The rigid portion comprises two end parts that can be moved towards one another thereby providing a compressive force on the sealing material, each end part comprising an inner part and one or more outer parts. A port for a cable is provided partly within the inner part and partly within the outer port, the part thereby having a substantially closed cross-section. The two end parts may be moved towards one another by means of a bolt extending through the end parts and the sealing material.

International Patent Application No. WO 92/22114 (Raychem B207) discloses an improvement of the cable seal described in WO 90/05401, comprising a sealing material, a resilient member that can be biassed to apply compression to the sealing material to cause it to form a seal, and stops means for limiting the biassing of the resilient member in a configuration in which the biassing can be increased by movement of the sealing material. This improved cable sealing has the advantage that the installer can tighten the resilient member until he feels a stop, knowing that the correct degree of tightening has been applied. In addition, displacement of sealing material may be accommodated, e.g. due to creeping of the material under the applied bias or due to thermal expansion.

International Patent Application No. WO 93/26069 discloses a cable sealing device comprising a housing and a seal, the seal comprising a sealing material between first and second plates. The housing has a cavity within which the seal can slide axially inwardly and outwardly with respect to the housing, in response respectively to excess external and excess internal pressure, and having first and second stop means which can engage respectively the first and second plates of the seal. The cable sealing device has an advantage in that excess pressure within or outside the closure can add to axial pressure on the sealing material and reinforce the seal. In addition, since the seal is free to move between the stop means, it can respond to excess pressure and deform, thereby reducing the extent to which its seal is in peel.

Another solution to the problem of sealing cable splice housings is disclosed in International Patent Application No. WO 92/05609 (Walter Rose WR140). This document discloses a sealing device comprising a sealing plate formed by a central inner disc element which has openings in its outer edge, and outer ring elements which can surround the openings in the edge of the inner disc. Adaptors may be secured in the openings in the edge of the inner disc element, each adaptor containing one or more channels for receiving one or more cables between the adaptor and the inner disc and/or the outer ring elements. The channels in the adaptors face towards the openings in the inner disc element, and sealing material may be provided in the channels.

The disclosures of each of the above International Patent Applications are incorporated herein by reference.

SUMMARY OF THE INVENTION

A first aspect of the present invention provides a sealing arrangement for sealing an annular space around one or more elongate objects, comprising:

(a) a sealing device having a port extending therethrough; and (b) an adaptor which can be placed within the port, comprising one or more openings for receiving at least one of the elongate objects; wherein the sealing arrangement comprises a sealant and compressing means for compressing the sealant, which compressing means can be moved longitudinally with respect to the elongate object(s) to compress the sealant so that the sealant is urged into sealing contact with the elongate object(s).

An advantage of the sealing arrangement of the invention is that, by providing a sealing device and an adaptor for the sealing device, the range of elongate objects, e.g. cables, wires and optical fibres, which may be accommodated and sealed is normally greatly increased in comparison to the range which may normally be accommodated by a single sealing device. This means that smaller inventory levels are generally required by the installer, and it may also have the advantage for the manufacturer of reducing the range of sizes of sealing device which need to be produced. The invention also combines these advantages with the advantages associated with sealing devices which function by means of compression of sealant, including ease of installation (which may normally be 'cold', i.e. not requiring heating of the sealant or the cable splice closure) and re-enterability. The invention has particular utility in the field of telecommunication cable splices, where it is common for a splice closure to accommodate and seal relatively large diameter cables and relatively small diameter 'drop' wires or single optical fibres.

In preferred embodiments of the invention, the compressing means and the sealant are provided by the adaptor. In other preferred embodiments, the compressing means and the sealant are provided by the sealing device. Both embodiments have their advantages, for example the former embodiment has the advantage that the correct quantity of sealant and no more may be provided as part of the adaptor and a range of sizes of adaptor may be provided for each size of sealing device. The latter embodiment has the advantage that the adaptor often does not need to have its own supply of sealant. Most preferably, however, the sealing device and the adaptor each provide the sealant (i.e. each has its own separate mass of sealant), this having the advantage that the sealing device may have sealant for sealing the periphery of the annular space and/or relatively large cross-section elongate objects, and the adaptor may have its own correct quantity of sealant for sealing relatively small cross-section elongate objects. It is especially preferred that the sealant provided by the sealing device and the sealant provided by the adaptor are in sealing contact with each other. In this way the interface between the adaptor, which is in a port in the sealing device, and the sealing device may be conveniently and effectively sealed.

A particularly preferred sealing arrangement according to the invention is one in which the sealing device and the adaptor each comprise compressing means and sealant, and activation of the compressing means of the sealing device compresses the sealant of the sealing device and simultaneously drives the compressing means of the adaptor longitudinally with respect to the elongate object(s) to compress the sealant of the adaptor. This generally provides a particularly convenient and simple way of sealing the space around elongate objects, for example cables in a cable splice closure. This preferred embodiment combines the advantages of using adaptors in a sealing device, as outlined above, with an ingenious way of sealing the entire annular space around a range of differently sized elongate objects substantially simultaneously. Because, in this preferred embodiment, the compressing means of the sealing device drive(s) the compressing means of the adaptor(s), it is generally not necessary to move the compressing means of the adaptor and the compressing means of the sealing device independently of each other in order to compress the sealant into sealing contact with each elongate object.

The contrary arrangement is also possible, in which the compression means of the sealing device is automatically activated by action of the compressing means of the adaptor.

Advantageously, in some embodiments of the invention, the compressing means provided by the adaptor comprises at least two, preferably only two, compressing parts and at least some of the sealant of the arrangement is located between the compressing parts, the compressing parts being movable towards each other longitudinally with respect to the elongate object(s) to compress the sealant so that the sealant is urged into sealing contact with the elongate objects. Preferably, the sealing device and the adaptor each provide the compressing means, and the compressing means provided by the sealing device comprises at least two, preferably two, compressing parts, the compressing parts provided by the sealing device being movable towards each other to drive the compressing parts provided by the adaptor towards each other. More preferably, the compressing means provided by the adaptor is provided with engagement means which can be engaged, in use, by the compressing means of the sealing device to drive the compressing means provided by the adaptor.

Accordingly, a second aspect of the invention provides a method of sealing an annular space around one or more elongate objects, comprising:

(i) placing an adaptor, comprising compressing means, around the elongate object and placing a sealing device, comprising compressing means around the adaptor, the adaptor and/or the sealing device further comprising sealant; and (ii) driving the compressing means of the adaptor longitudinally with respect to the elongate object(s) by means of the compressing means of the sealing device, thereby compressing the sealant so that the sealant is urged into sealing contact with the elongate object(s).

In a preferred method according to the invention, the adaptor and the sealing device each comprise sealant, and when each sealant is compressed, the sealant of the adaptor and the sealant of the sealing device are urged into sealing contact with each other.

More preferably, the method according to the invention comprises a method of sealing an annular space between an outer housing and the one or more elongate objects, wherein the method also comprises the step of inserting the adaptor containing the sealing device into the housing, and step (ii) causes the sealant to be urged into sealing contact also with the housing. It is particularly preferred that when the sealing device and the adaptor each comprise sealant, the sealant of the adaptor is urged into sealing contact with the elongate objects and the sealant of the sealing device is urged into contact with the housing.

As well as providing sealing arrangements and a method of sealing, the invention also provides an adaptor per se. A third aspect of the invention therefore provides a substantially cylindrical adaptor for a sealing device, comprising one or more openings for receiving one or more elongate objects, the adaptor comprising:

(a) a sealant;

(b) compressing means for compressing the sealant; and (c) engagement means;

wherein the engagement means are provided on the curved outer surface of the adaptor and can be engaged, in use, by a member external to the adaptor to move the compressing means to compress the sealant so that the sealant is urged into sealing contact with the elongate object(s).

The term 'cylindrical' is used herein to mean a generally prismatic shape having a generally uniform cross-section, a curved periphery and substantially flat end faces (which in our invention are usually open). The term includes cylinders having a generally circular cross-section. The adaptor according to the invention has the advantage that it may normally be inserted into a sealing device to enable the device to accommodate and seal smaller diameter elongate objects than the sealing device may easily seal without the adaptor. The adaptor normally therefore widens the range of sizes of elongate objects, e.g. cables, wires or optical fibres, which a sealing device can seal. In addition, because the adaptor is provided with engagement means, on its curved outer surface, which can be engaged by a member external to the adaptor to move the compressing means to compress the sealant, the adaptor may be adjusted from a non-sealing mode to a sealing mode 'automatically' by means of an external member. The external member may advantageously comprise the sealing device into which the adaptor is disposed. In the broadest aspect of the invention, however, the adaptor may be used to form a seal without cooperating with a sealing device. For example, the adaptor may be disposed in a cable splice closure to seal the closure by itself. In this broadest aspect, as well as in the narrower aspect of the adaptor cooperating with a sealing device to seal a closure, the fact that the adaptor may be adjusted between its sealing and non-sealing modes by means of an external member, has its advantages. It means, for example, that it is not normally necessary to provide means such as bolts or the like extending through the adaptor, in order to compress the sealant, in contrast to some prior art sealing devices, for example as disclosed in International Patent Applications WO 90/05401 (Raychem B161), WO 92/22114 (Raychem B207) and WO 93/26069 (Raychem B227). This has an advantage in that it may provide an increased area in the end of a cable splice closure for the cables to extend through, or alternatively it may allow a reduction in the cross-section of cable splice closure.

The adaptor according to the third aspect of the invention may be the adaptor that is used in the sealing arrangement according to the first aspect of the invention. Any or all of the preferred features of the adaptor described with reference to the first aspect of the invention may likewise be present in the adaptor according to the third aspect of the invention.

The engagement means (where present) of the adaptor preferably comprise(s) one or more shoulder(s) which can be engaged by one or more cooperating part(s) of the external member, e.g. one or more parts of the sealing device. The term 'shoulder' is used broadly and is intended generally to include any shoulder, ledge, flange, protrusion, indented portion or the like. It is preferred for the cooperating part(s) of the external member to comprise part of an internal surface of a port extending through the sealing device. For example, in a particularly preferred embodiment, the sealing device is provided with generally frusto-conical crowns as part of the or each port, and it is preferred that these crowns engage the engagement means, e.g. shoulders, of the adaptor.

In a preferred embodiment, the adaptor is wraparound. By 'wraparound' is meant that the adaptor is open in cross-section so that the adaptor may be disposed around the or each elongate object without having to slide the adaptor onto the ends of the objects.

Accordingly, a fourth aspect of the invention provides a sealing arrangement for sealing an annular space around one or more elongate objects, comprising:

(a) a sealing device having a port extending therethrough; and (b) an adaptor which can be placed within the port, comprising one or more openings for receiving at least one of the elongate objects; wherein the adaptor is wraparound.

The compressing means of the adaptor and/or the sealing device according to all aspects of the invention are preferably relatively rigid, more preferably substantially rigid. The compressing means are preferably formed from a plastics material, e.g. polypropylene, but they may instead be formed from other rigid materials, e.g. metal.

In embodiments of the invention in which the adaptor is wraparound, the or each compressing part is also normally wraparound so it can be opened out to receive the elongate objects and can subsequently be closed around the objects. The sealant is preferably also wraparound so it may be opened out and closed, together with the compressing portions, around the elongate objects. The compressing parts are therefore preferably hinged, each part preferably having at least one, more preferably two, hinge portions. In addition, to ensure that the adaptor does not accidentally open out, the compressing parts are preferably provided with fastening means, which may for example interlock, to keep opposing portions fastened together.

The adaptor is provided with one or more openings for receiving elongate objects. A preferred number of openings is three, and a particularly preferred adaptor is one in which each compressing part has two hinges and each of the three hinged portions provides part of two out of the three openings.

The sealant according to the invention may generally comprise any sealing material which when compressed may be urged, for example by lateral expansion, into sealing contact with the elongate objects. The sealant may, for example, comprise mastic or grease, especially a highly viscous grease such as a silicone grease. Preferably, however, the sealant comprises gel.

The gel may, for example, comprise silicone gel, urea gel, urethane gel, or any suitable gel or gelloid sealing material. Preferred gels comprise oil—extended polymer compositions. Preferably the gel has a hardness at room temperature as determined using a Stevens-Volland Texture Analyser of greater than 45 g, particularly greater than 50 g especially greater than 55 g, e.g. between 55 g and 60 g. It preferably has a stress-relaxation less than 12%, particularly less than 10% and especially less than 8%. Ultimate elongation, also at room temperature, is preferably greater than 60%, especially greater than 1000%, particularly greater than 1400%, as determined according to ASTM D638. Tensile modulus at 100% strain is preferably at least 1.8, more preferably at least 2.2 MPa. In general compression set will be less than 35%, especially less than 25%. Preferably, the gel has a cone penetration as measured by ASTM D217 of at least 50 ($10^{-1}$ mm), more preferably at least 100 ($10^{-1}$ mm), even more preferably at least 200 ($10^{-1}$ mm) and preferably no greater than 400 ($10^{-1}$ mm), especially no greater than 350 ($10^{-1}$ mm).

The polymer composition may for example comprise an elastomer, or a block copolymer having relatively hard blocks and relatively elastomeric blocks. Examples of such copolymers include styrene-diene block copolymers, for example styrene-butadiene or styrene-isoprene diblock or triblock copolymers, or styrene-ethylene-butylene-styrene triblock copolymers as disclosed in international patent publication number WO88/00603. Preferably, however, the polymer composition comprises one or more styrene-ethylene-propylene-styrene block copolymers, for example as sold under the Trade Mark 'Septon' by Kuraray of Japan. Septon 2006 is a particularly preferred grade. The extender liquids employed in the gel preferably comprise oils conventionally used to extend elastomeric materials. The oils may be hydrocarbon oils, for example paraffinic or naphthenic oils, synthectic oils for example polybutene or polypropene oils, and mixtures thereof. The preferred oils are mixtures of non-aromatic paraffins and naphthenic hydrocarbon oils. The gel may contain known additives such as moisture scavengers (eg. Benzoyl chloride), antioxidants, pigments and fungicides.

The sealing arrangement according to the invention also preferably includes one or more plugs arranged to be inserted into the adaptor to seal one or more openings in the adaptor. The plugs generally enable openings in the adaptor to be sealed when no elongate objects extend through the openings. This has an advantage in that the adaptor may normally be opened and re-closed many times during its service life (known as 're-enterability'), and cables, wires, or fibres etc may be added to, or removed from, the adaptor. The plugs themselves are preferably elongate.

BRIEF DESCRIPTION OF THE DRAWINGS

The invention will now be described, by way of example, with reference to the accompanying drawings, in which:

FIG. 5b shows the plug of FIG. 5a

FIG. 5c shows an end view of the adaptor of FIG. 5a

FIG. 6b shows a sectional view of the arrangement shown in FIG. 6a;

FIG. 7b shows a sectional view of the arrangement shown in FIG. 7a;

DESCRIPTION OF THE PREFERRED EMBODIMENTS

Figure 1:
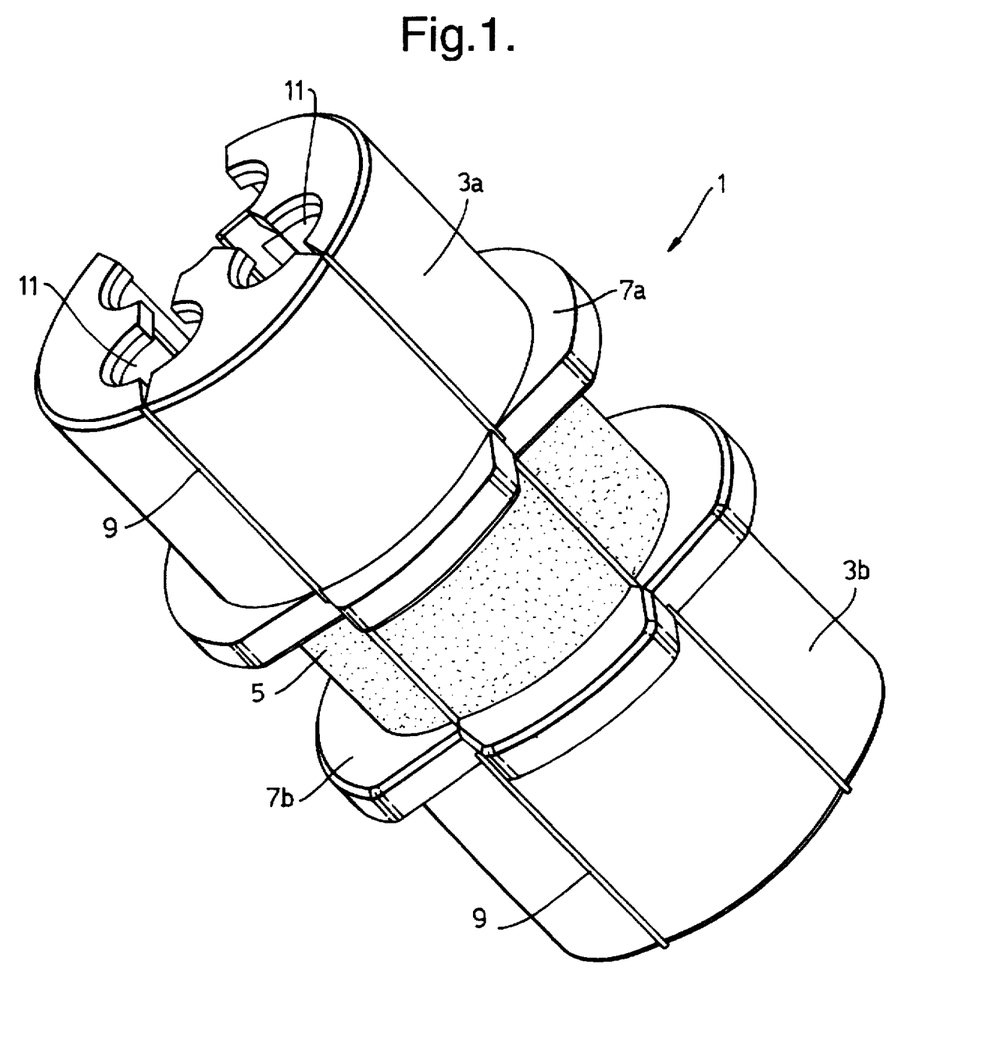
FIG. 1 shows an adaptor according to the invention.

FIG. 1 shows an adaptor 1 according to the invention, comprising two compressing parts 3a and 3b formed from a plastic material, e.g. polypropylene, which together comprise the compressing means of the adaptor, and gel 5 located between the two compressing parts. Engagement means 7a and 7b in the form of ledges or flanges are located at the end of each compressing part adjacent to the gel. Each compressing part is provided with two hinge portions 9, formed from a relatively thin strip of plastic material, so that the adaptor, which is wraparound, may be opened out to receive one or more elongate objects, e.g. cables. In the figure, the adaptor is shown in a semi-open configuration. The adaptor is also provided with three openings 11 for receiving elongate objects. Each compressing part comprises three portions, which are defined by the two hinge portions, and each portion provides the halves of two openings, such that when the adaptor is closed and the three portions come together the three openings are formed.

Figure 2:
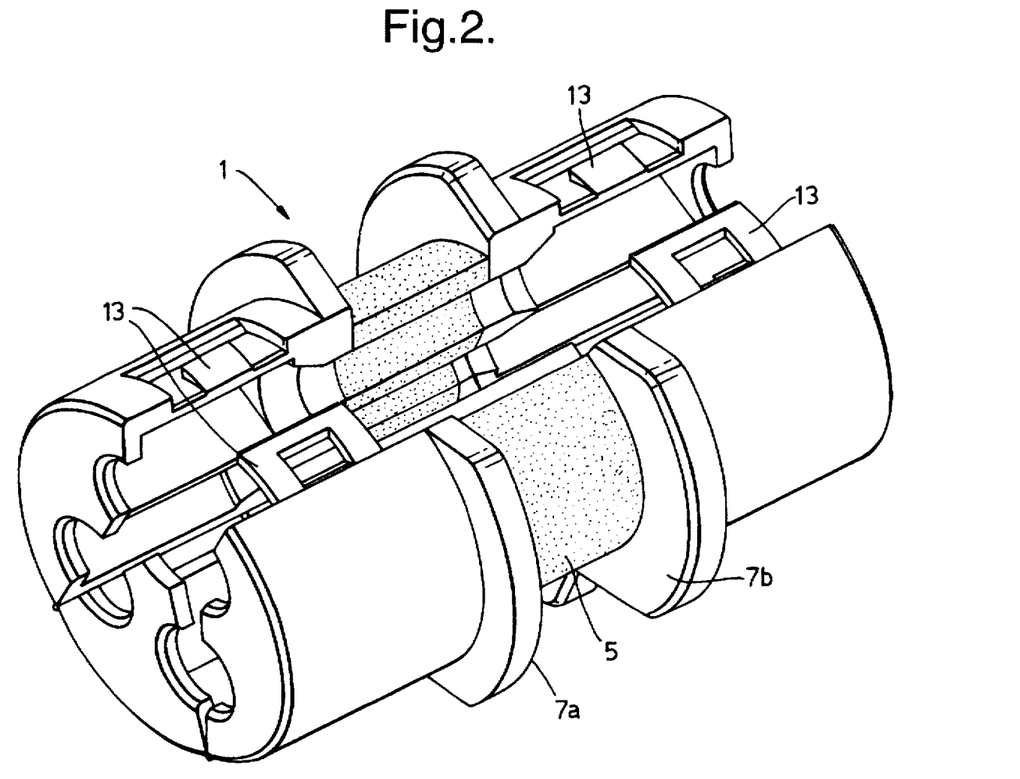
FIG. 2 shows the adaptor of FIG. 1 from a different direction.

FIG. 2 shows the adaptor 1 of FIG. 1 from a different direction. From this direction, part of the interior of the adaptor is visible, and it can be seen that the halves of the openings in the adaptor extend through the adaptor and are also provided in the gel. In addition, each compressing part has fastening means 13 in the form of clasps, for fastening the adaptor in its closed configuration.

Figure 3:
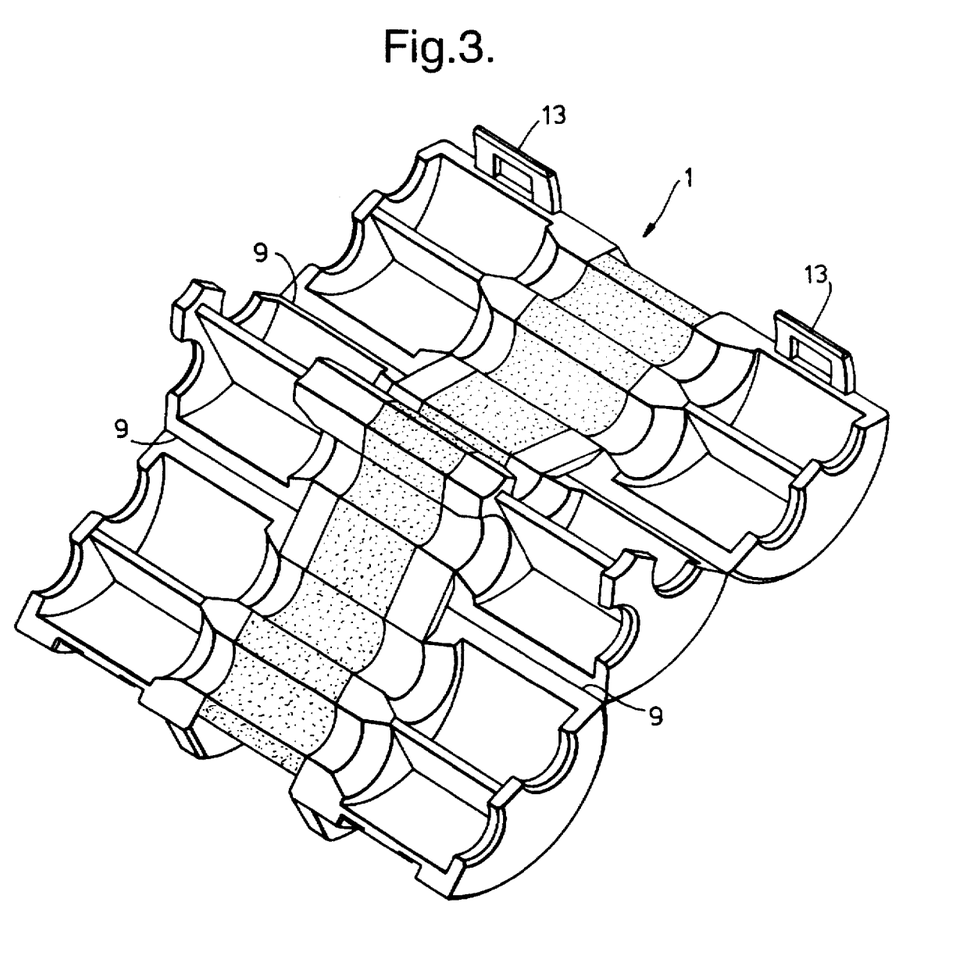
FIG. 3 shows the adaptor of FIGS. 1 and 2 in an opened out configuration.
Figure 4:
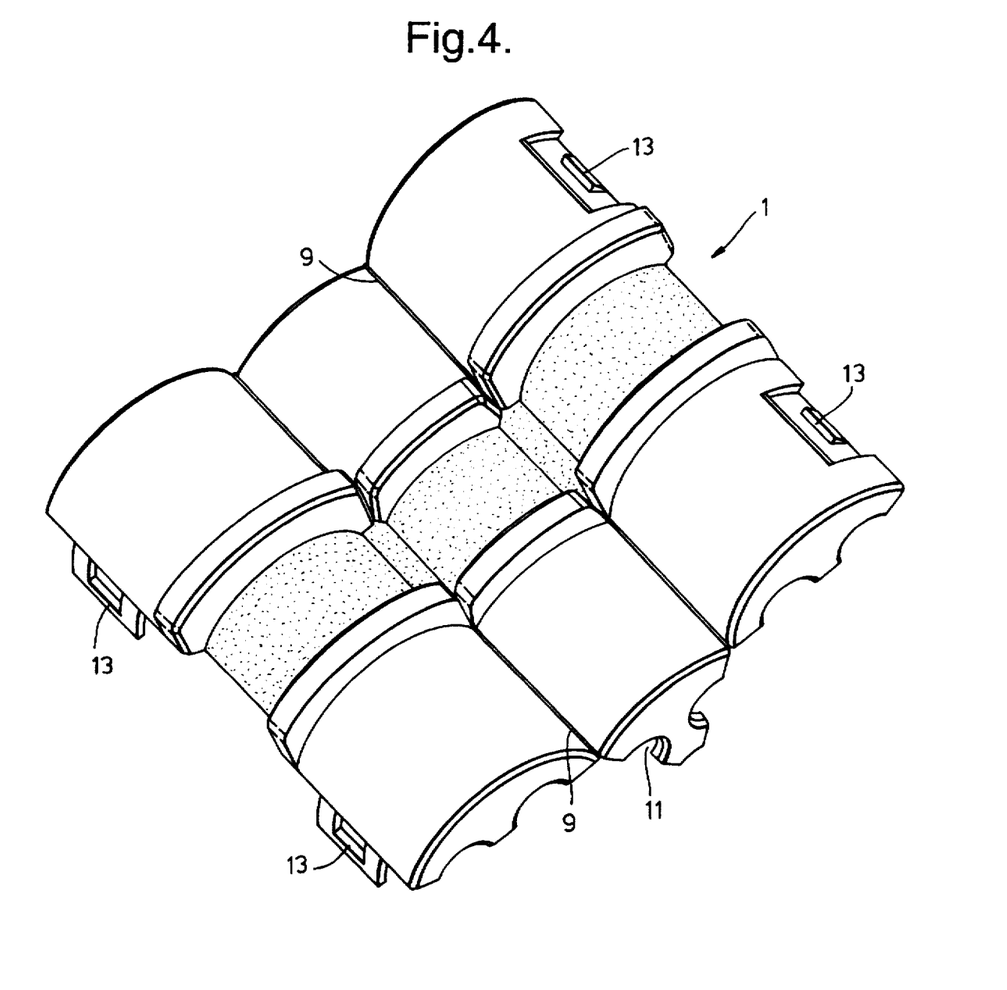
FIG. 4 shows the adaptor as shown in FIG. 3 from a different direction.

FIGS. 3 and 4 show the adaptor 1 of FIGS. 1 and 2 in its fully opened-out configuration, FIG. 3 illustrating the interior of the adaptor and FIG. 4 its exterior. The hinge portions 9, the halves of the openings 11, and the clasps 13 can all be clearly seen.

Figure 5A:
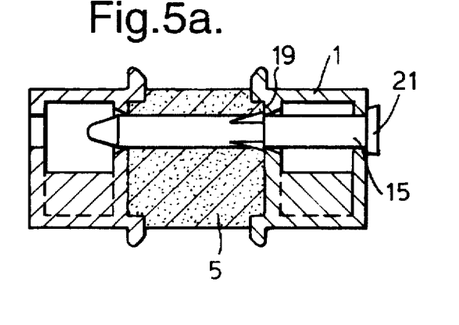
FIG. 5a shows an adaptor according to the invention in section, with a plug located therein.
Figure 5B:
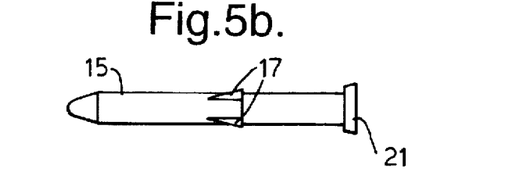
Figure 5C:
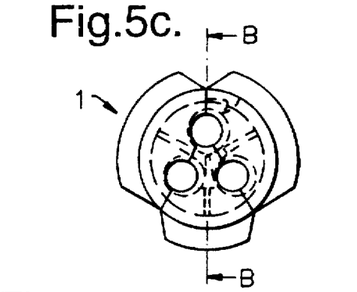

FIG. 5 shows an adaptor 1 according to the invention and a plug 15. FIG. 5a is a sectional elevation of the adaptor on line BB shown in FIG. 5c, showing the plug located in an opening in the adaptor. The plug is provided with raised tines 17 which engage an end surface 19 of one of the compressing parts, adjacent to the gel, and a rear flange 21 provided on the plug engages an opposite end surface of the compressing part. The raised tines and the rear flange of the plug are provided to help to maintain the plug in position in the adaptor opening. The plug is arranged to block off the opening in the adaptor when in use, the opening is not occupied by a wire or a cable or the like.

Figure 6A:
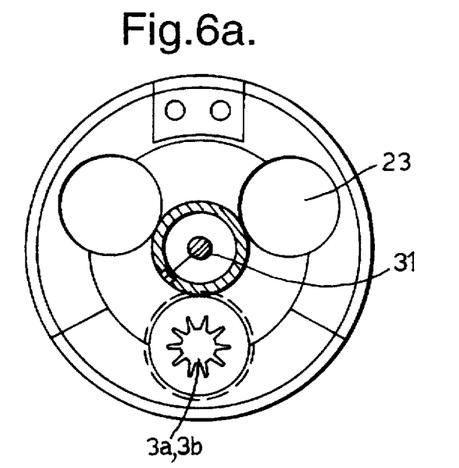
FIG. 6a shows an end view of a sealing arrangement according to the invention.
Figure 6B:
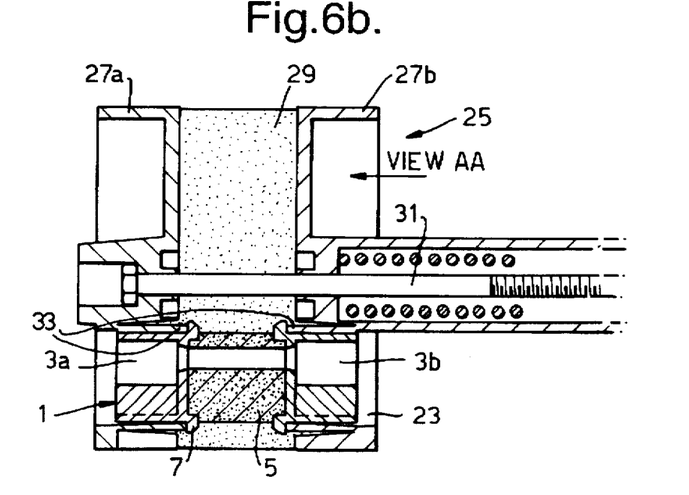
Figure 7A:
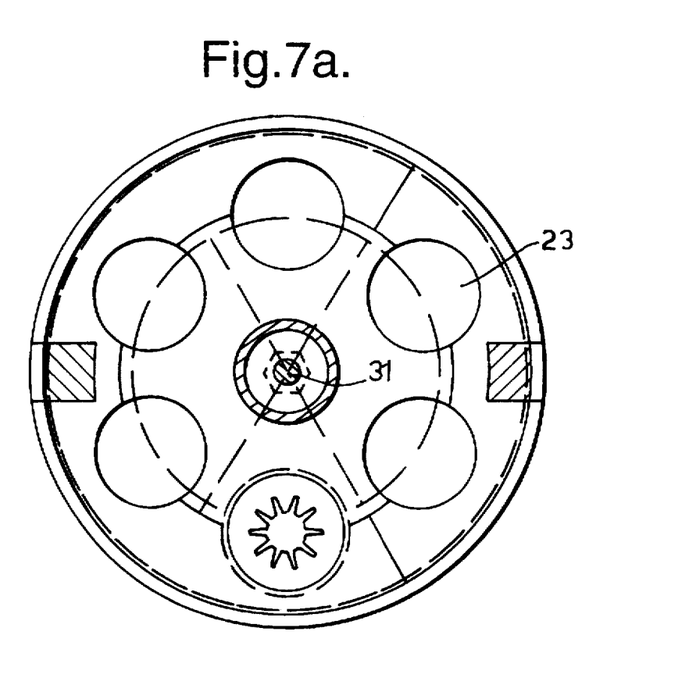
FIG. 7a shows an end view of another form of sealing arrangement according the invention.
Figure 7B:
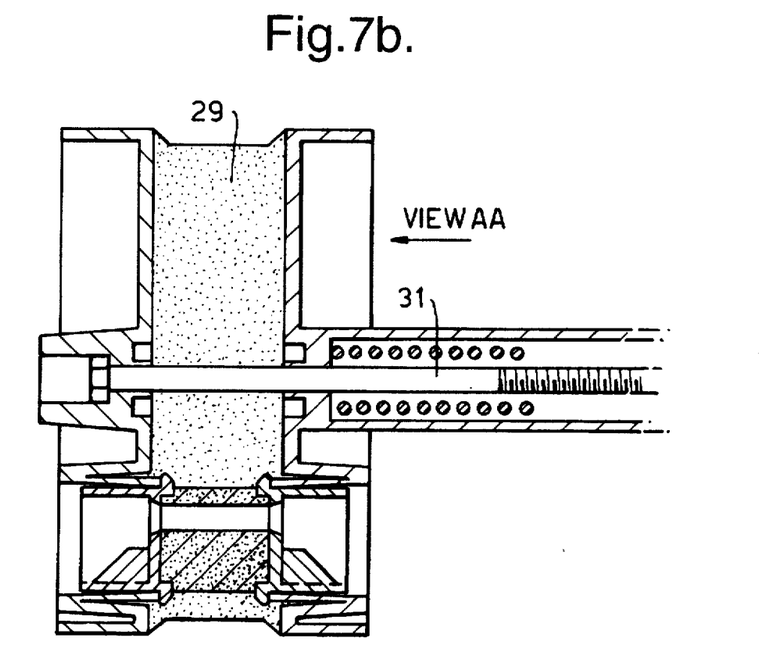

FIGS. 6 and 7 each show an end view and a sectional view of a sealing arrangement according to the invention comprising a sealing device and an adaptor. The arrangement of FIG. 7 is substantially the same as that of FIG. 6, with the exception that the sealing device of the latter arrangement is provided with three ports 23 and the former arrangement is provided with six ports. FIG. 6b shows a sealing device 25 according to the invention comprising two compressing parts 27a and 27b which together comprise the compressing means of the sealing device. Located between the two compressing parts is sealant 29 in the form of gel. A bolt 31 extends through both compressing parts and through the gel 29, the bolt being the means by which the two compressing parts 27a and 27b may be moved towards each other to compress the gel. An adaptor 1 according to the invention is located in one of the ports 23 of the sealing device. As in the previous figures, the adaptor comprises two compressing parts 3a and 3b and a quantity of sealant (gel) 5 disposed between the compressing parts. While the gel 29 of the sealing device and the gel 5 of the adaptor are shaded differently for clarity, the composition of each gel may be, and preferably is, identical and are in sealing contact with each other. The engagement flanges 7 of each compressing part of the adaptor are in abutting engagement with cooperating parts 33 of the internal surface of the port of the sealing device. The cooperating parts of the sealing device comprise crowns extending towards the gel in the centre of the sealing device. The crowns 33 are shown more clearly in FIG. 6a (and FIG. 7a). FIG. 6a shows a view of the sealing device in the direction of the arrow AA, prior to the insertion of the adaptor into the bottom port.

The sealing arrangements shown in FIGS. 6 and 7 may be used to seal a cable splice closure for example, by insertion of the cables into the ports 23 of the sealing device 25 and/or insertion of optical fibres or drop wires into the openings 11 in one or more adaptors 1 and subsequent insertion of the adaptor(s) into one or more sealing device ports. The sealing arrangement containing the cables and wires or fibres may then be inserted into an end of the splice closure and the bolt 31 tightened to move the compressing parts 27a and 27b of the sealing device towards each other. This movement of the compressing parts of the sealing device compresses the gel 29 urging the gel laterally outwards to form a seal between the sealing device and the cable closure and laterally inwards into sealing engagement with the cables extending through the sealing device. In addition, the movement together of the compressing parts 27a and 27b drives the compressing parts 3a and 3b of the adaptor 1 towards each other, thereby compressing the sealant 5 of the adaptor laterally outwards into sealing contact with the gel 29 and laterally inwards into sealing contact with the wires or fibres extending through the adaptor.

Figure 8:
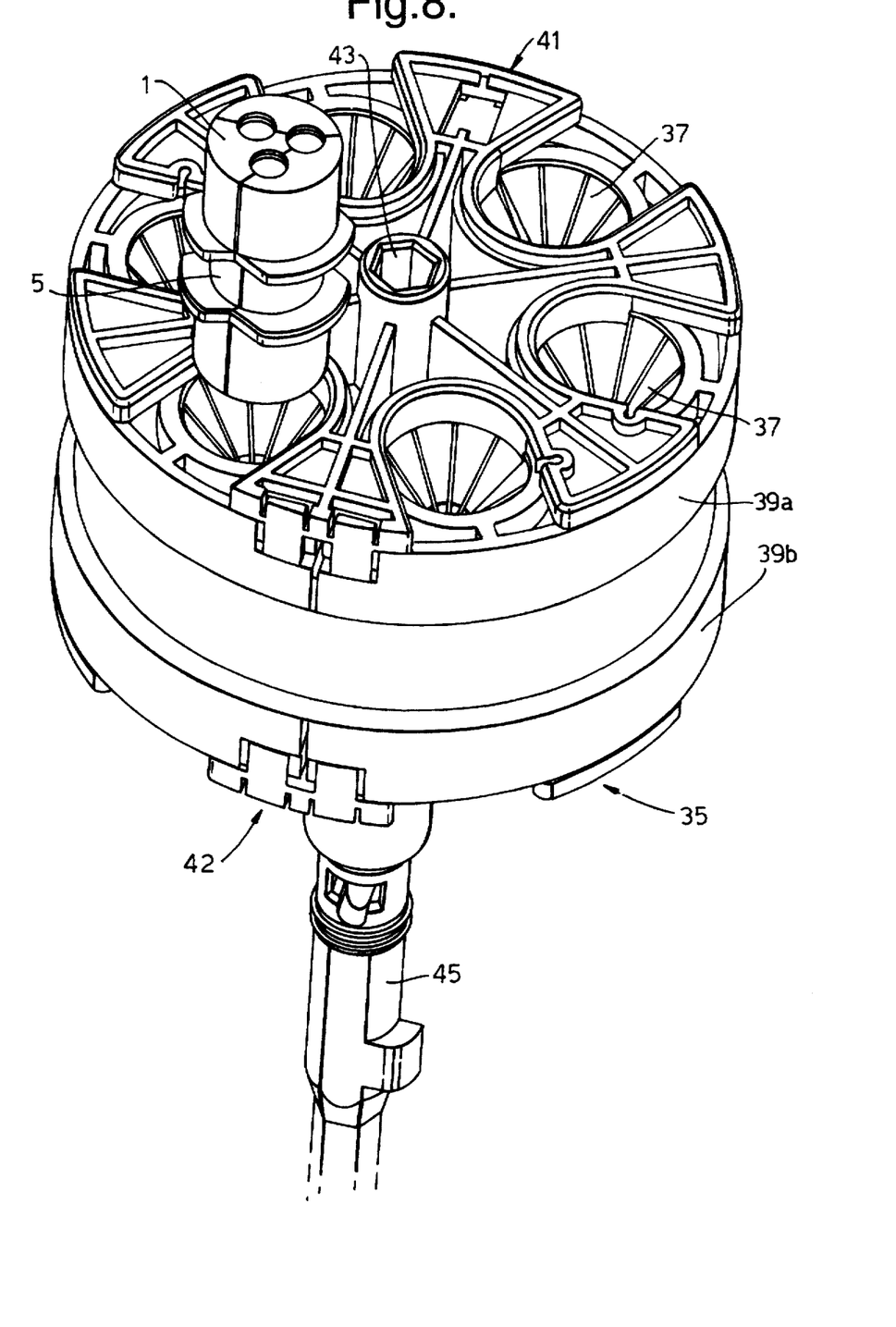
FIG. 8 shows in perspective the sealing arrangement of FIGS. 7a and 7b, wherein an adaptor is shown prior to insertion in a sealing device.

FIG. 8 shows in perspective the sealing arrangement shown in FIGS. 7a and 7b. An adaptor 1, substantially as shown in FIGS. 1 to 4, is shown prior to insertion into a sealing device 35. This sealing device is provided with six ports extending therethrough, each port being defined in part by crowns 37, in compressing parts 39a and 39b, arranged in a substantially frusto-conical shape. Gel 29 and 5 is provided as usual between the compressing parts of each of the sealing device and the adaptor respectively.

Both the sealing device and the adaptor are wraparound, the sealing device having two outer portions which are hinged in the region indicated by the numeral 41 and which are fastened closed in the region indicated by the numeral 42. The two compressing parts 39a and 39b of the sealing device may be moved towards each other by means of the central bolt 43 which may be tightened by means of the elongate member 45.

Figure 9:
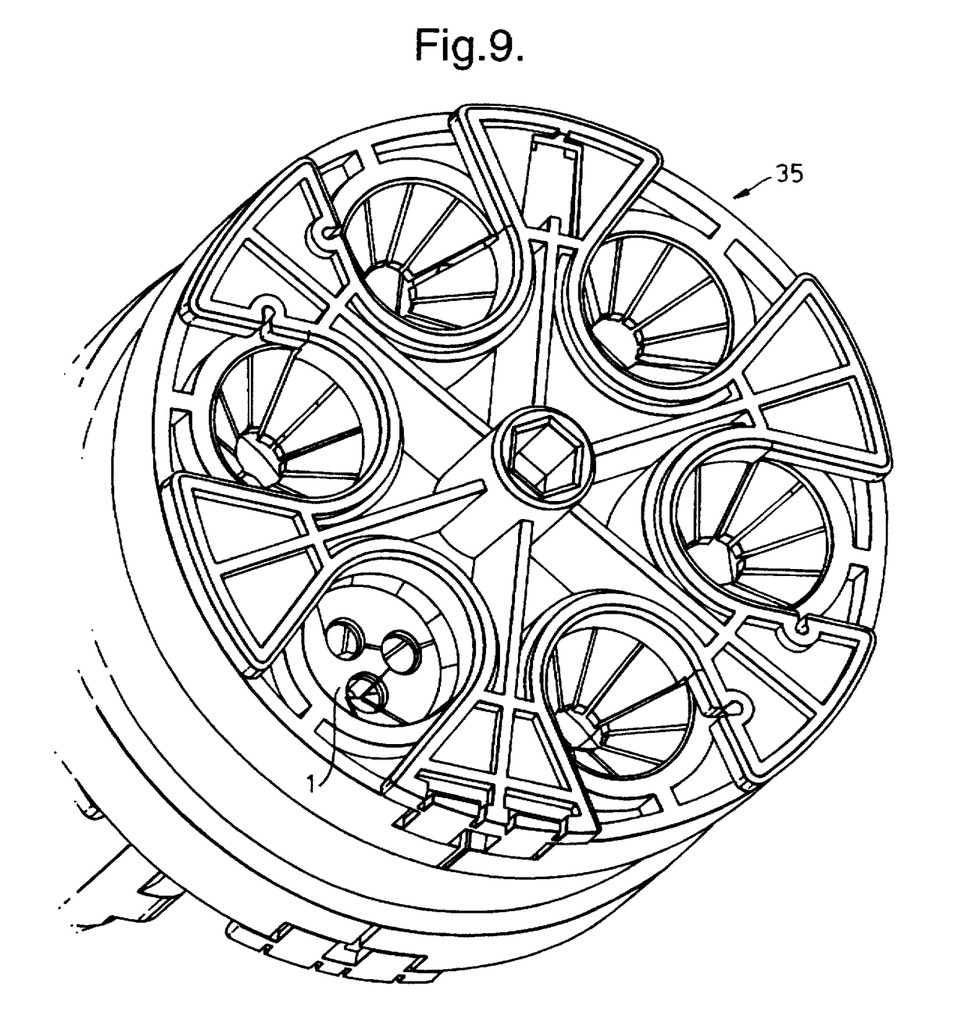
FIG. 9 shows in perspective the arrangement shown in FIG. 8, with the adaptor placed within a port extending through the sealing device.

FIG. 9 shows the arrangement of FIG. 8 with the adaptor 1 placed in one of the ports extending through the sealing device. The crowns 37 of the sealing device have engaged the flanges 7 of the adaptor to retain the adaptor in the sealing device and to facilitate the driving of the compressing parts of the adaptor towards one another.

We claim:

1. A sealing apparatus for sealing an end of an enclosure comprising:

a sealing device having a port extending therethrough, said sealing device being configured so as to be placed within said end of said enclosure and in sealing engagement with an inner surface of said enclosure, said sealing device further including a driver;

an adaptor to be placed within said port, said adaptor comprising:

an opening for receiving an elongate object to be inserted into said enclosure;

a first compressing part;

a second compressing part longitudinally offset from said first compressing part; and a sealant disposed between said first compressing part and said second compressing part and in communication with said opening of said adaptor;

wherein said driver positions said first compressing part and said second compressing part in longitudinally movable positions relative to each other; and wherein longitudinal movement of said first compressing part toward said second compressing part compresses said sealant to urge said sealant into contact with an elongate object in said opening.

2. A sealing apparatus according to claim 1 wherein said sealant is a gel.

3. A sealing apparatus according to claim 1 wherein said sealing device comprises:

a sealing device sealant;

compressing means for compressing said sealing device sealant to urge said sealing device sealant into contact with at least one of said inner surface of said enclosure or said adaptor.

4. A sealing apparatus according to claim 3 wherein said compressing means comprises means for compressing said sealing device sealant to urge said sealing device sealant into contact with said inner surface of said enclosure and with said adaptor.

5. A sealing apparatus according to claim 3 wherein said sealing device sealant is a gel and wherein said compressing means for compressing said sealing device sealant comprises means for urging said sealing device sealant into sealing contact with said sealant of said adaptor.

6. A sealing apparatus according to claim 5 wherein said compressing means comprises a third compressing part and a fourth compressing part longitudinally offset from said third compressing part and wherein said driver connects said third compressing part and said fourth compressing part in longitudinally movable positions relative to each other.

7. A sealing apparatus according to claim 6 wherein said driver is a bolt.

8. A sealing apparatus according to claim 6 wherein said adaptor further comprises engagement means for operatively connecting said driver to at least one of said first compressing part and said second compressing part.

9. A sealing apparatus according to claim 8 wherein said engagement means is a shoulder.

10. A sealing apparatus according to claim 9 wherein said sealing device further comprises a crown positioned in said port so as to engage said shoulder.

11. A sealing apparatus according to claim 1 wherein said adaptor comprises:

a first longitudinally extending portion;

a second longitudinally extending portion rotatably connected to said first longitudinally extending portion; and wherein each of said portions defines a segment of said opening so as to form said opening when said portions are rotated into a closed position.

12. A sealing arrangement for sealing an annular space around an elongate object, comprising:

a sealing device comprising:
       a port extending through said sealing device;
       a first sealant positioned within said sealing device and in communication with said port; and
       a first compressing means for urging said first sealant towards said port; and an adaptor placed within said port of said sealing device, said adaptor comprising:
       an opening therein for receiving said elongate object;
       a second sealant communicating with said opening; and
       second compressing means for urging said second sealant toward said opening; and wherein an activation of said first compressing means compresses said first sealant to seal a periphery of said annular space and further drives said second compressing means longitudinally with respect to the elongate object to thereby compress said second sealant so that said second sealant is urged into sealing contact with the elongate object and said second sealant and said first sealant are urged into sealing contact with each other.

13. A method of sealing an annular space around an elongate object to be inserted into an enclosure comprising the steps of:

placing an adaptor including adaptor compressing means and a sealant around the elongate object;

placing the adapter within a port of a sealing device, said sealing device including sealing device compressing means and a sealing device sealant around the adaptor;

placing the sealing device into an end of the enclosure; and driving the adaptor compressing means longitudinally with respect to the elongate object with the sealing device compressing means to compress the sealant of the adaptor into sealing contact with the elongate object.

14. A method according to claim 13 wherein the sealant of the adaptor and the sealing device sealant are in sealing contact with each other and wherein said driving step further comprises the step of:

driving the sealing device sealant into sealing contact with an inner face of the enclosure.

* * * * *